Figure 7:
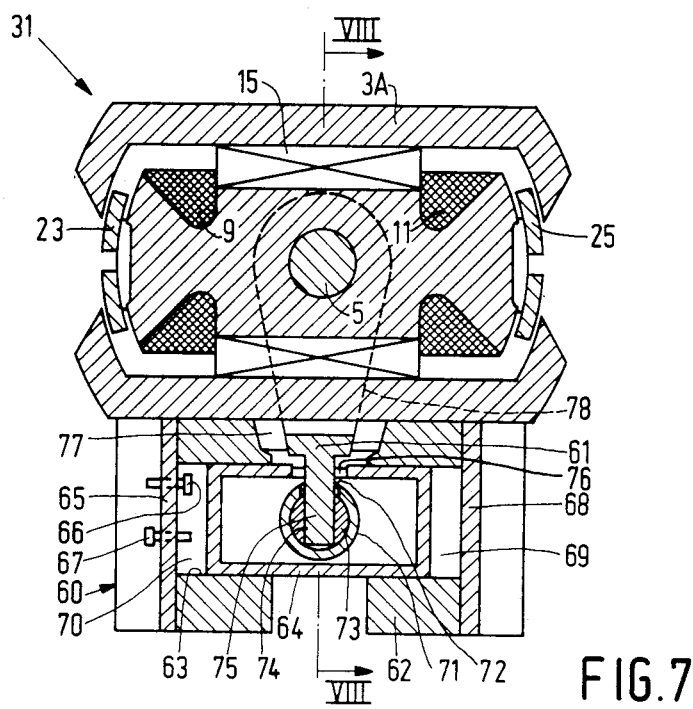

United States Patent [19]

Bianchi et al.

[11] Patent Number: 4,700,090
[45] Date of Patent: Oct. 13, 1987

[54] MOTOR-COMPRESSOR UNIT

[75] Inventors: Vittorio Bianchi, Ferrera, Italy; Johannes M. M. Hensing, Eindhoven; Robert H. Munnig Schmidt, Drachten, both of Netherlands

[73] Assignee: U.S. Philips Corporation, New York, N.Y.

[21] Appl. No.: 752,887

[22] Filed: Jul. 8, 1985

[30] Foreign Application Priority Data

Jul. 9, 1984 [IT] Italy .............................. 21808 A/84

[51] Int. Cl.$^4$ ............................................ H02K 33/00
[52] U.S. Cl. ........................................ 310/36; 310/38; 417/416
[58] Field of Search .................................. 310/36–39, 310/29, 33; 417/416–418

[56] References Cited

U.S. PATENT DOCUMENTS

| | | | |
|---|---|---|---|
| 1,739,885 | 12/1929 | Zbinden | 310/38 |
| 2,732,124 | 1/1956 | Poliansky | 417/416 |
| 2,899,124 | 8/1959 | Chausson | 310/36 X |
| 3,039,395 | 6/1962 | Chausson | 310/36 X |
| 3,075,471 | 1/1963 | Miller | 310/36 X |
| 3,187,990 | 6/1965 | Chausson | 310/36 X |
| 3,248,581 | 4/1966 | Allen | 310/37 |
| 3,959,673 | 5/1976 | Montagu | 310/38 |
| 4,626,717 | 12/1986 | Bianchi et al. | 310/36 |

FOREIGN PATENT DOCUMENTS 582931 5/1932 Fed. Rep. of Germany .

*Primary Examiner*—Donovan F. Duggan
*Attorney, Agent, or Firm*—Thomas A. Briody; William J. Streeter; Rolf E. Schneider

[57] ABSTRACT

A motor-compressor unit comprises a motor including a magnetizable stator; an armature oscillatable about the motor shaft axis; two coils arranged opposite each other on the stator; and a magnetizable core extending between the coils. The stator has opposed sections spaced from each other and arranged to define air gaps between such stator sections and the core at the end faces of the coils remote from each other, such air gaps being concentric about the motor shaft axis. A permanent magnet is disposed between each stator section and the core, a pole of each magnet facing the core. A plurality of pole elements is associated with the armature and is arranged such that oscillation of the armature causes one pole element to move into its respective air gap and another pole element to move out of its respective air gap. The coils and the core are arranged such that passage of an alternating current through the coils causes flux alternately to increase in a first air gap and to decrease in a second air gap and then to decrease in the first air gap and to increase in the second air gap. The compressor includes a linearly reciprocating piston, and a lever connecting such piston to the motor shaft.

4 Claims, 10 Drawing Figures

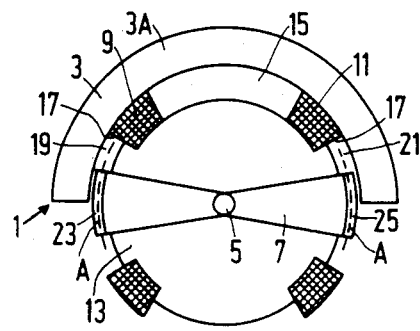
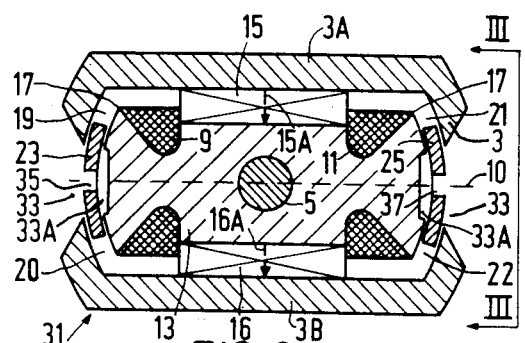
FIG.1  FIG.2
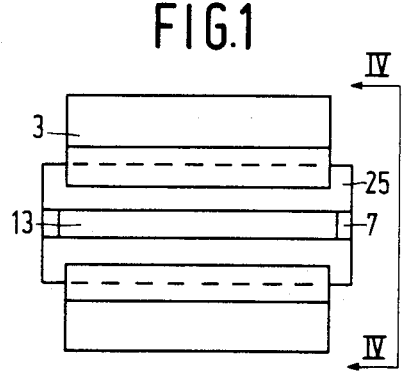
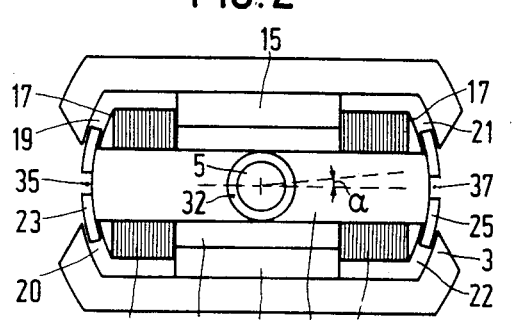
FIG.3  FIG.4
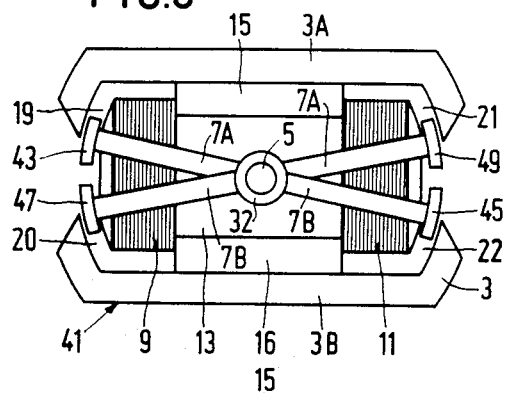
FIG.5
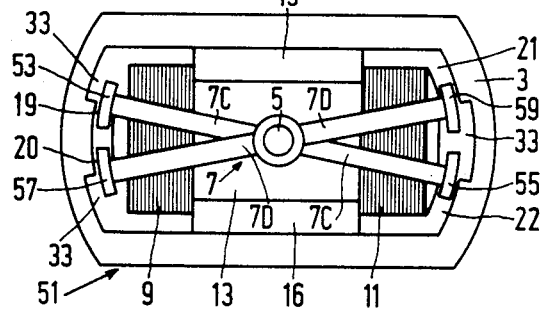
FIG.6

MOTOR-COMPRESSOR UNIT

This invention relates to a motor-compressor unit including a motor comprising a magnetizable stator and an oscillatory armature, such motor being provided with two coils which are arranged opposite each other and between which a magnetizable core extends, parallel to which core a first stator section provided with a magnet is arranged, one of the poles of the magnet facing the core, air gaps being formed between the stator and the core at those end faces of the coils which are remote from each other, in which air gaps magnetizable pole elements of the armature are movable.

Such a motor is described in the article "Der schwingende Synchronlinearmotor mit Dauermagneten als Resonanz-Zugkrafterreger" in the magazine "Elektrotechnik und Maschinebau", Jahrgang 96, Heft 10.

The known oscillating motor is constructed as a linear motor with two magnets and four mutually parallel air gaps. The pole elements of the armature are arranged in the air gaps and are movable along a straight path. In the operating condition the coils may be connected to an alternating-voltage source, the magnetic field thus produced in the coils cooperating with the permanent-magnetic field produced by the magnets. Under the influence of the magnetic forces which are then exerted on the pole elements the armature can oscillate linearly relative to the stator.

The armature of the known oscillating motor is supported by elastic elements. Under operating conditions such a construction allows a movement of the armature in the transverse direction due to the retentive forces acting on the pole elements. This has the drawback that the oscillatory motion of the armature is no longer perfectly linear and is not reproducible. Moreover, the clearance of the pole elements relative to the stator and the core must be comparatively large in order to prevent the pole elements from coming into contact with the stator and the core.

Therefore, the known oscillating motor is not suitable for uses in which the armature is required to follow exactly a predetermined path. For such uses complete control of the armature movement is necessary. The known oscillating motor must therefore be equipped with guide means for the armature. Guide means for linear motors are known per se, but such guide means, which generally comprise guide rods and linear bearing means, generally exhibit flexure under heavy loads. A linear oscillating motor provided with a known guide means provides satisfactory results only if the retentive forces are small. In the case of large retentive forces the requiements imposed on the armature movement cannot be very stringent. Moreover, in practice constructing a rectilinear guide mechanism for the armature with sufficient rigidity and suitable dimensions is not a simple task due to the nature of the linear oscillating motor.

The present invention aims at improving such an oscillating motor so as to mitigate the problem of the armature supporting means.

According to the invention the oscillating motor is characterized in that the pole elements follow a part of a circular path during their movement through circularly arcuate air gaps, the armature being pivotal about the motor shaft.

The armature of the oscillating motor in accordance with the invention can be mounted on the motor shaft by means of a simple and inexpensive bearing arrangement, for example roller bearings, such as ball-bearings, which are known per se. Such bearings can readily take up the load caused by the retentive forces. This has the advantage that the oscillating motor in accordance with the invention is very stable, the armature being capable of performing an accurately defined and reproducible movement.

In the operating condition the armature of the oscillating motor in accordance with the invention performs an oscillatory movement about the motor shaft or spindle, enabling the centre position of the armature, the angular-displacement amplitude of the armature, and the frequency of the oscillatory movement of the armature to be controlled by, for example, an electronic control unit.

The aforementioned properties in combination with its high efficiency and high effective power make the oscillating motor in accordance with the invention suitable for a wide variety of uses. For example, the oscillating motor may be used for driving control valves, reciprocating compressors, such as continuously variably compressors in refrigerators, and cutting members in shavers.

For constructional reasons a preferred embodiment of the invention is characterized in that the motor shaft which carries the armature extends transversely of the axis of the magnet and the common axis of the coils.

Another preferred embodiment is characterized in that a second stator section provided with a magnet which cooperates with the core is situated opposite the first stator section, the stator having recesses at the location of the pole elements.

An advantage of this embodiment is that the motor has a high efficiency and is capable of delivering a high effective power without the dimensions of the motor being affected significantly by the aforementioned features.

A further preferred embodiment is characterized in that the armature comprises two pole elements which are each provided with a slot which extends parallel to the motor shaft.

The feature utilized in this embodiment precludes unnecesary loss of flux due to magnetic short-circuits between the armature and the stator. Preferably, the core is also formed with recesses at the location of the pole elements.

Yet aother embodiment is characterized in that the armature comprises two armature sections which are pivotal independently of each other and which each comprise two pole elements, the magnets being magnetized oppositely.

The armature sections may be mounted on the same motor shaft and can perform mutually opposite pivotal movements. An advantage of this embodiment is that two drive possibilities are available, which is favourable for specific uses, for example, for driving a compressor comprising two pistons or for driving a shearing or cutting device.

Preferably, the pole elements of the two-section armature are arranged in diametrically opposite pairs relative to the motor shaft. This has the advantage that mechanical vibrations in the motor system are minimized without the use of additional provisions such as counterweights.

A further embodiment is characterized in that the movements of the pole elements of the armature are directed at least substantially transversely of the common axis of the coils, the motor shaft being mounted centrally in the motor.

This embodiment has the advantage that the dimensions are small, so that the oscillating motor is particularly suitable for use in a small appliance. Moreover, the small dimensions lead to a reduction of the magnetic path-lengths and hence the magnetic losses.

The oscillating motor according to the invention is in particular suitable for use in a motor compressor unit.

Figure 8:
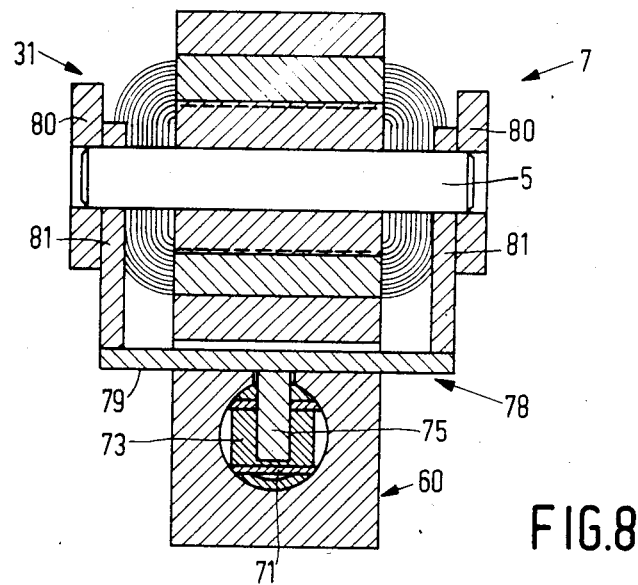
Figure 9:
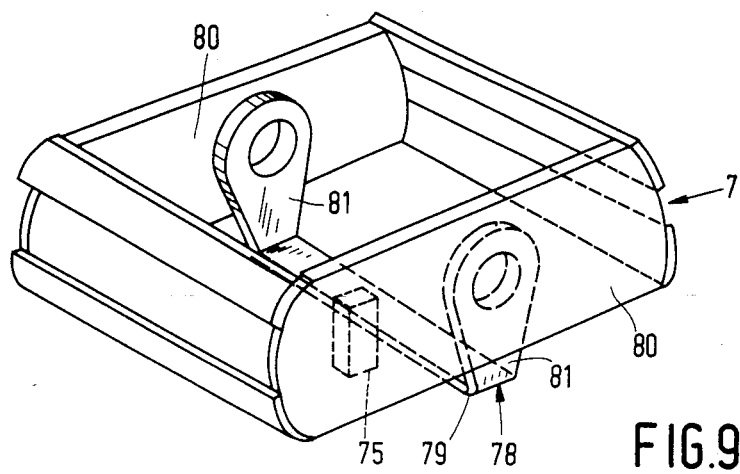
Figure 10:
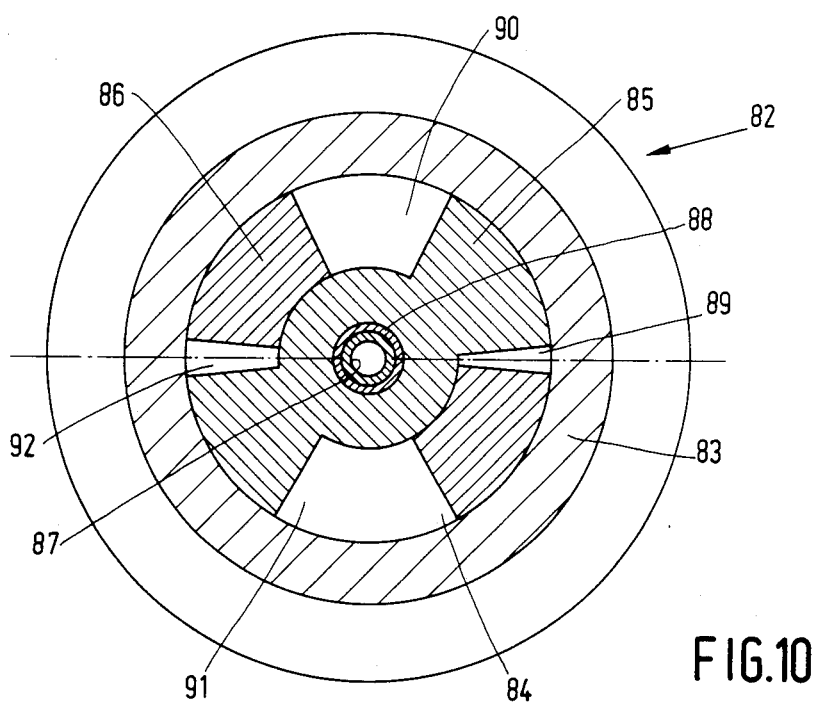

The invention will now be described in more detail with reference to the accompanying drawings, in which:

FIG. 1 shows diagrammatically the oscillating motor in accordance with the invention, FIG. 2 is a sectional view of a first embodiment of the invention, FIG. 3 shows the oscillating motor in a diagrammatic view taken on the line III—III in FIG. 2, FIG. 4 shows the oscillating motor in a sectional view taken on the line IV—IV in FIG. 3, FIG. 5 shows diagrammatically a second embodiment of the invention, FIG. 6 shows a diagrammatically a third embodiment of the invention, FIG. 7 is a diagrammatic vertical sectional view through a motor compressor unit according to the invention, FIG. 8 shows a sectional view taken on the line VIII—VIII of FIG. 7, FIG. 9 is a diagrammatic perspective view of the rotor of the oscillating motor, FIG. 10 is a diagrammatic sectional view, taken perpendicular to its axis, through a compressor of another embodiment of a motor compressor unit according to the invention.

The oscillating motor in accordance with the invention which is shown diagrammatically in FIG. 1 bears the reference numeral 1 and comprises a stator 3 and an armature 7 which is oscillatory about the motor shaft 5. The oscillating motor 1 further comprises two coils 9 and 11 (shown in cross-section for the sake of clarity), between which a magnetizable core 13 extends. A magnet 15 is arranged between the core 13 and a first stator section 3A which extends parallel to said core, of which magnet one pole is positioned against the core 13 and the other pole against the stator section 3A. At the end faces 17 of the coils 9 and 11 which are remote from each other air gaps 19 and 21 are formed between the stator 3 and the core 13 in which air gaps pole elements 23 and 25 of the armature 7 are disposed. Since the armature 7 is pivotal about the motor shaft 5 the pole elements 23 and 25 follow a circular path during their movements, as is indicated by the broken line A, the centre of said path being situated on the axis of the motor shaft 5. The air gaps 19 and 21 have arcuate shapes in conformity with the shape of the path A.

When the coils 9 and 11 are energized so that a suitable alternating current flows through the turns of the coils 9 and 11, an alternating magnetic field is produced around the coils 9 and 11, which field cooperates with the magnetic field produced by the magnet 15. The magnetic forces which then act on the pole elements 23 and 25 give rise to an oscillatory movement of the armature 7 about the motor shaft 5, the pole elements 23 and 25 being alternately drawn into the air gaps 19 and 21, respectively, by the magnetic forces.

Any retentive forces which may act between the pole elements 23 and 25 and the armature 7 with the core 3 are directed radially relative to the motor shaft 5 and can be taken up simply by means of a rotary bearing.

Some oscillating motors embodying the invention will be described with reference to FIGS. 2 to 6. Parts already mentioned in the above description of the principle of the present oscillating motor bear the same reference numerals as in FIG. 1.

FIGS. 2, 3 and 4 show a first embodiment. The oscillating motor 31 comprises two facing stator sections 3A and 3B of a stator 3, a magnet 15 being arranged between a ferromagnetic core 13 and the stator section 3A and a magnet 16 between the core 13 and the stator section 3B. The magnetic axis 16A of the magnet 16 is disposed in line with the magnetic axis 15A of the magnet 15. Two coils 9 and 11 are wound on the core 13, which coils have a common axis 10 which extends transversely of the magnetic axes 15A and 16A. The motor shaft 5 which is mounted in the core 13 extends transversely of the axes 10, 15A and 16A.

An armature 7 is pivotally mounted on the motor shaft 5 by means of a rotary bearing 32, known per se, and comprises two pole elements 23 and 25. At the location of the pole elements 23 and 25 the stator 3 is formed with through-going recesses 33 which divide the stator into two stator sections 3A and 3B which are spaced from each other. The recesses 33 serve to prevent magnetic short-circuits. In the present example the core 13 is formed with recesses 33A. It is obvious that the recesses 33 and 33A may be filled with a non-magnetizable material, such as a plastic.

Near each of the end faces of the coils 9 and 11 which are remote from each other two circularly arcuate air gaps 19, 20 and 21, 22, respectively, are formed between the stator 3 and the core 13, in which gaps the respective pole elements 23 and 25 of the armature 7 are movable. The pole elements 23 and 25 each have a slot, 35 and 37 respectively, which extends parallel to the motor shaft 5 and which serves to preclude loss of magnetic flux.

In the drawing the armature 7 is shown in a central position. Under operating conditions the armature 7 in the present embodiment has a maximum angular displacement amplitude $\alpha$ of 7°.

FIG. 5 is an axial view of a second embodiment of the invention. In the same way as the preceding embodiment the oscillating motor 41 comprises a stator 3 with two stator sections 3A and 3B which are spaced from each other by recesses and between which a soft-iron core 13, a motor shaft 5, two coils 9 and 11, and two magnets 15 and 16 are arranged. Two air gaps 19, 20 and 21,22 adjoin the coils 9 and 11 respectively.

In the present example the magnets 15 and 16 are arranged in such a way that two like magnet poles face each other, i.e. the magnets 15 and 16 are magnetized in opposite directions. A two-section armature is mounted on the motor shaft 5, the armature sections 7A and 7B being pivotal independently of each other. The armature sections 7A and 7B may be mounted on the motor shaft 5 by means of ballbearings 32. Each of the armature sections 7A and 7B is provided with two pole elements, the pole elements 43 and 49 of the armature section 7A being movable in the air gaps 19 and 21, respectively and the pole elements 47 and 45 of the armature section 7B being movable in the air gaps 20 and 22, respectively.

When the coils 9 and 11 are energized the armature sections 7A and 7B can move in opposite directions, which armature sections 7A and 7B may be coupled to a device to be driven, either independently or in combination.

For a vibration-free motor counterweights may be used in order to ensure that the centres of gravity of the armature sections 7A and 7B are situated on the axis of the motor shaft 5.

FIG. 6 is an axial view of a third embodiment. In the same way as in the preceding embodiments the oscillating motor 51 comprises a stator 3, a core 13 with two coils 9 and 11, two magnets 15 and 16, four air gaps 19, 20 and 21, 22 and a motor shaft 5 which is mounted in the core 13 and which carries an armature.

The armature comprises two independently movable sections 7C and 7D which are each provided with two diametrically arranged pole elements 53, 55 and 57,59, respectively. At the locations of the pole elements 53, 55, 57 and 59 the stator 3 has recesses 33. The construction of the oscillating motor 51 in the present embodiment is asymmetrical, which is due to the non-symmetrical arrangement of the recesses 33. One of the recesses 33 is situated between the air gaps 21 and 22 and the two other recesses 33 are each situated on one side of the adjoining air gaps 19 and 20.

In the same way as in the preceding embodiment, the magnets 15 and 16 are magnetized oppositely, so that under operating conditions the two armature sections 7C and 7D oscillate in phase opposition about the motor shaft 5.

The special construction of the oscillating motor 51 results in a balanced symmetrical armature, so that counterweights may be dispensed with.

FIGS. 7, 8 and 9 illustrate the use of an oscillating motor according to FIG. 2 in a motor compressor unit.

The motor compressor unit according to the invention comprises an oscillating motor 31, a linearly reciprocating compressor 60 and a linkage 61 for transmitting motion from the former to the latter.

The compressor 60 comprises a casing 62 defining a cylindrical cavity 63 in which a piston 64 is slidably mounted. The cavity 63 is closed at one end by a conventional plate 65 which carries a suction valve 66 and a delivery valve 67 which are also conventional. The other end of the cavity 65 can be opened or closed by a plate 68, as shown, to form with one of the closed ends of the piston 64 a variable volume chamber 69 enclosing a mass of gas (for example air) which thus constitutes a gas spring. The closed one end of the piston 64 represents one of the walls of a variable volume chamber 70 in which for example the refrigerant fluid of a refrigeration circuit is compressed, it being drawn in and pushed out through the valves 66 and 67 respectively.

Transversely to the piston 64 there extends a bush 71 rigidly associated therewith and provided with a passage 72 through its cylindrical wall. Inside said bush there is located a small cylinder 73 in such a manner as to be able to rotate about is geometrical axis. This small cylinder comprises a diametrical bore 74 into which there extends a finger 75 which passes both through the passage 72 and through two apertures 76 and 77 provided respectively in the piston 64 and in the casing 62 of the compressor 60.

The linkage 61 comprises the small cylinder 73, and the finger 75 which forms an integral part of a lever 78 having a U-shaped part 79 (see FIGS. 8 and 9) which is rigidly formed with the armature or rotor 7 of the oscillating motor 31.

The rotor 7 comprises a pair of spaced-apart parallel side-pieces 80, to each of which is joined one of the arms 81 of the U-shaped part 79 of the lever 78.

Thus the to-and-fro movement of the rotor 7 is transmitted by the lever 78 and the finger 75 which slidably engages the bore 74, to the piston 64.

FIG. 10 is a diagrammatic cross-section through the compressor of another embodiment of a motor compressor unit in which an oscillating motor 41 according to FIG. 5 is used.

The compressor 82 comprises a cylindrical casing 83 with at the ends side covers such as 84. Two oscillating pistons 85, 86 are disposed inside the compartment thus formed, and are driven by two concentric shafts 87, 88. The oscillating pistons comprise two opposing lobes having the configuration of a cylindrical segment and which pistons define two variable volume working chambers 89, 90 for compressing and transporting an operating fluid, and two variable volume chambers 91, 92 where trapped gas (for example air) acts as a gas spring. Said shafts 87, 88 can be directly connected to corresponding shafts of armature sections 7A and 7B of the oscillating motor of FIG. 5 by conventional couplings, not shown. Thus the oscillating movement in opposite directions of the armature sections 7A and 7B is directly transmitted to the pistons 85, 86.

What is claimed is:

1. A motor-compressor unit comprising a motor including a magnetizable stator; an armature oscillatable about the motor shaft axis; two coils arranged opposite each other on said stator; a magnetizable core extending between said coils; said stator having opposed sections spaced from each other and arranged to define air gaps between said stator sections and the core at the end faces of the coils remote from each other, said air gaps being concentric about the motor shaft axis; a permanent magnet disposed between each stator section and the core, a pole of each magnet facing the core; a plurality of pole elements associated with the armature and arranged such that oscillation of the armature causes one pole element to move into its respective air gap and another pole element to move out of its respective air gap; said coils and said core being arranged such that passage of an alternating current through the coils causes flux alternately to increase in a first air gap and to decrease in a second air gap and then to decrease in the first air gap and to increase in the second air gap; and a compressor including a linearly reciprocating piston, and a lever connecting said piston to the motor shaft.

2. A motor-compressor unit according to claim 1, in which the compressor includes a bush rigidly associated with the piston, and a cylindrical member disposed in the bush and provided with an aperture for slidable disposition of one end of the lever.

3. A motor-compressor unit according to claim 2, in which the lever is configured as a fork having arms rigidly formed with the motor shaft.

4. A motor-compressor unit according to claim 1, in which the motor shaft extends transversely of the axis of the magnets and the common axis of the coils.

* * * * *